United States Patent
Chan

(10) Patent No.: US 10,963,181 B2
(45) Date of Patent: Mar. 30, 2021

(54) IP-PBX SYSTEM WITH THE CAPABILITY OF AUTOMATIC DATA BACKUP AND METHOD USING THE SAME

(71) Applicant: Charles Lap San Chan, Taipei (TW)

(72) Inventor: Charles Lap San Chan, Taipei (TW)

( * ) Notice: Subject to any disclaimer, the term of this patent is extended or adjusted under 35 U.S.C. 154(b) by 11 days.

(21) Appl. No.: 16/407,846

(22) Filed: May 9, 2019

(65) Prior Publication Data
US 2020/0142595 A1     May 7, 2020

(30) Foreign Application Priority Data
Nov. 6, 2018   (TW) ................. 107139245

(51) Int. Cl.
*G06F 3/06* (2006.01)
*G06F 13/16* (2006.01)
*G06F 13/42* (2006.01)
*H04L 29/06* (2006.01)

(52) U.S. Cl.
CPC ............ *G06F 3/065* (2013.01); *G06F 3/067* (2013.01); *G06F 3/0619* (2013.01); *G06F 3/0622* (2013.01); *G06F 3/0637* (2013.01); *G06F 3/0659* (2013.01); *G06F 13/1668* (2013.01); *G06F 13/4282* (2013.01); *H04L 65/1053* (2013.01); *G06F 2213/0042* (2013.01)

(58) Field of Classification Search
CPC ...... G06F 3/065; G06F 3/0619; G06F 3/0622; G06F 3/0637; G06F 3/0659; G06F 3/067; G06F 13/1668; G06F 13/4282; G06F 2213/0042; G06F 11/1464; H04L 65/1053
See application file for complete search history.

(56) References Cited

U.S. PATENT DOCUMENTS

| 6,073,220 | A | * | 6/2000 | Gunderson | ......... G06F 11/1456 711/112 |
| 2009/0210427 | A1 | * | 8/2009 | Eidler | ................. G06F 11/1484 |
| 2014/0250324 | A1 | * | 9/2014 | Shih | .................... G06F 11/1456 714/15 |

* cited by examiner

*Primary Examiner* — Hiep T Nguyen
(74) *Attorney, Agent, or Firm* — Muncy, Geissler, Olds & Lowe, P.C.

(57) ABSTRACT

An IP-PBX system with the capability of automatic data backup and a method using the same is disclosed. The system includes one or more first devices, one or more second devices, and an IP-PBX having at least a first data storing area. The IP-PBX is installed with a verification program. The verification program verifies the backup permission of the first device or the second device when the first device or the second device reads the first data storing area. The first device is installed with a first control program and at least a backup verification code. The first control program drives a backup instruction set to automatically search the first data storing area and downloads the content of the first data storing area to the first device according to the backup verification code when the first device is electrically connected to the IP-PBX.

20 Claims, 3 Drawing Sheets

IP-PBX SYSTEM WITH THE CAPABILITY OF AUTOMATIC DATA BACKUP AND METHOD USING THE SAME

This application claims priority for Taiwan patent application no. 107139245 filed on Nov. 6, 2018, the content of which is incorporated by reference in its entirely.

BACKGROUND OF THE INVENTION

Field of the Invention

The present invention relates to an Internet protocol private branch exchange (IP-PBX) with the capability of data backup, particularly to an IP-PBX system with the capability of automatic data backup and a method using the same. The IP-PBX system is installed with a data storing media and an automatic verification backup program. As soon as the IP-PBX is connected to a device, the IP-PBX automatically uses the data storing media and the automatic verification backup program to copy and transfer stored data to the device for backup purposes and to automatically classify the backup data in the device.

Description of the Related Art

Based on the Internet protocol, developers (e.g., enterprises) use Internet protocol private branch exchanges (IP-PBXs) to develop value-added services and applications. Presently, the value-added applications of the IP-PBX are provided by developers (e.g., enterprises). The basic application is in replacing the conventional private branch exchanges (PBXs) and providing the central switchboard more conveniently managed and used. Due to the value-added services, the traffic volumes rapidly increase. Thus, the data stored in the data storing area of the IP-PBX need to be periodically copied and erased for backup purposes. Since the IP-PBX has a limited volume, the IP-PBX does not be installed with a large data storing area (e.g., a hard disk). Instead, a user prepares a storing device for storage and operates it himself/herself. Alternatively, the user uploads the data of the IP-PBX to the Cloud. However, these ways require the cost of purchasing or installing data storing equipment, the professional knowledge, and the time for data backup. Thus, it is inconvenient for users that use the functions (e.g., the central switchboard and additional application programs) of the IP-PBX to complete the data backup of the IP-PBX.

To overcome the abovementioned problems, the inventor of the present invention actively researches and seeks breakthroughs to provide users of an IP-PBX with a data storing device that is installed with an automatic verification backup program and developed by a system provider or an administrator (e.g., the manufacturer of the IP-PBX) based on professional capability for research, development and manufacture and design experience in the field of traffic communications. The present invention provides an IP-PBX system with the capability of automatic data backup and a method using the same. The IP-PBX system is provided with a data storing media and an automatic verification backup program. As soon as the IP-PBX is connected to a device, the IP-PBX automatically uses the data storing media and the automatic verification backup program to copy and transfer stored data to the device for backup purposes and to automatically classify the backup data in the device. The IP-PBX system makes it more convenient to complete system maintenance and data backup to satisfy the requirement of users.

SUMMARY OF THE INVENTION

The primary objective of the present invention is to provide an IP-PBX system with the capability of automatic data backup and a method using the same. The IP-PBX system is installed with a data storing media and an automatic verification backup program. As soon as the IP-PBX is connected to a device, the IP-PBX automatically uses the data storing media and the automatic verification backup program to copy and transfer stored data to the device for backup purposes and to automatically classify the backup data in the device.

To achieve the abovementioned objectives, the present invention provides an IP-PBX system with the capability of automatic data backup, which comprises: an IP-PBX, comprising first device connecting units, second device connecting units, network connecting units, and at least a first data storing area, installed with a backup verification program, and the first device connecting units, the second device connecting units, and the network connecting units are electrically connected to a motherboard; and one or more first devices and one or more second devices, the first device connecting unit is correspondingly electrically connected to the first device, the second device connecting unit is correspondingly electrically connected to the second device, the backup verification program verifies backup permission of the first device or the second device when the first device or the second device reads the at least a first data storing area, the first device is a storing medium having at least a second data storing area, the first device is installed with a first control program and at least a backup verification code, and the first control program drives a backup instruction set to automatically search the at least a first data storing area of the IP-PBX and downloads the content of the at least a first data storing area of the IP-PBX to the first device according to the at least a backup verification code when the first device is electrically connected to the first device connecting unit of the IP-PBX.

In an embodiment of the present invention, the IP-PBX system further comprises one or more third devices, the third device is electrically connected to the first device, and the first device copies and transfers the content of the at least a first data storing area to the third device.

In an embodiment of the present invention, the IP-PBX is installed with the backup verification program using a system management platform, the first device is installed with the first control program and the at least a backup verification code using a system management platform, and the third device is electrically connected to a system management platform and installed with a downloading verification program.

In an embodiment of the present invention, the first device connecting units are USB ports and the first devices are USB disks.

In an embodiment of the present invention, the second device connecting units comprise AUX ports, serial ports, I/O ports, or a combination of these and the second device is a personal computer, a notebook computer, a server, a smartphone, a telephone, or an electronic device.

In an embodiment of the present invention, the user or the administrator of the IP-PBX prepares for a data storing device as the third device, such as a large-capacity hard disk, a personal computer, or a notebook computer.

In an embodiment of the present invention, the network connecting unit is a connecting port of a wired network or a wireless network.

The present invention provides a method applied to the IP-PBX system with the capability of automatic data backup, which comprises: Step (A): a user using the first device installed with the first control program and the at least a backup verification code for backup purposes; Step (B): the first control program determines that the first device is electrically connected to the IP-PBX or the third device: when the first device is electrically connected to the IP-PBX, the first control program driving the backup instruction set to automatically search the at least a first data storing area of the IP-PBX and performing Step (C); and when the first device is electrically connected to the third device, performing Step (E); Step (C): the IP-PBX driving the backup verification program to verify whether backup permission of the at least a backup verification code of the first device is granted: if yes, sending out a successful verification message to the user and performing Step (D); and if no, rejecting the first device to read the at least a first data storing area of the IP-PBX and sending out a warning for backup rejection to the user; Step (D): downloading the content of the at least a first data storing area of the IP-PBX to the first device, creating a first backup data directory and first classified subdirectories thereof in the first device, and storing the content of the at least a first data storing area of the IP-PBX in the first classified subdirectories; Step (E): the first control program requesting the third device to verify whether backup permission of the at least a backup verification code is granted: if yes, performing Step (F); and if no, rejecting the third device to read the first device and sending out a warning for reading rejection to the user; and Step (F): the first control program automatically determining whether a second backup data directory and second classified subdirectories thereof corresponding to the first backup data directory and the first classified subdirectories have been created in the third data storing area of the third device: if no, automatically creating the second backup data directory, creating the second classified subdirectories according to its backup month, and copying and transferring the content of the at least a first data storing area of the IP-PBX from the first classified subdirectories to the second classified subdirectories; and if yes, copying and transferring the content of the at least a first data storing area of the IP-PBX from the first classified subdirectories to the second classified subdirectories.

As mentioned above, the present invention provides an IP-PBX system with the capability of automatic data backup and a method using the same. As soon as the IP-PBX is connected to a device, the IP-PBX automatically uses the data storing media and the automatic verification backup program to copy and transfer stored data to the device for backup purposes and to automatically classify the backup data in the device.

Below, the embodiments are described in detail in cooperation with the drawings to make easily understood the technical contents, characteristics and accomplishments of the present invention.

DETAILED DESCRIPTION OF THE INVENTION

The present invention provides an Internet protocol private branch exchange (IP-PBX) system with the capability of automatic data backup and a method using the same. The IP-PBX system is installed with a data storing media and an automatic verification backup program. As soon as the IP-PBX is connected to a device, the IP-PBX automatically uses the data storing media and the automatic verification backup program to copy and transfer stored data to the device for backup purposes and to automatically classify the backup data in the device. The preferred embodiment of the present invention is described as follows.

Figure 1:
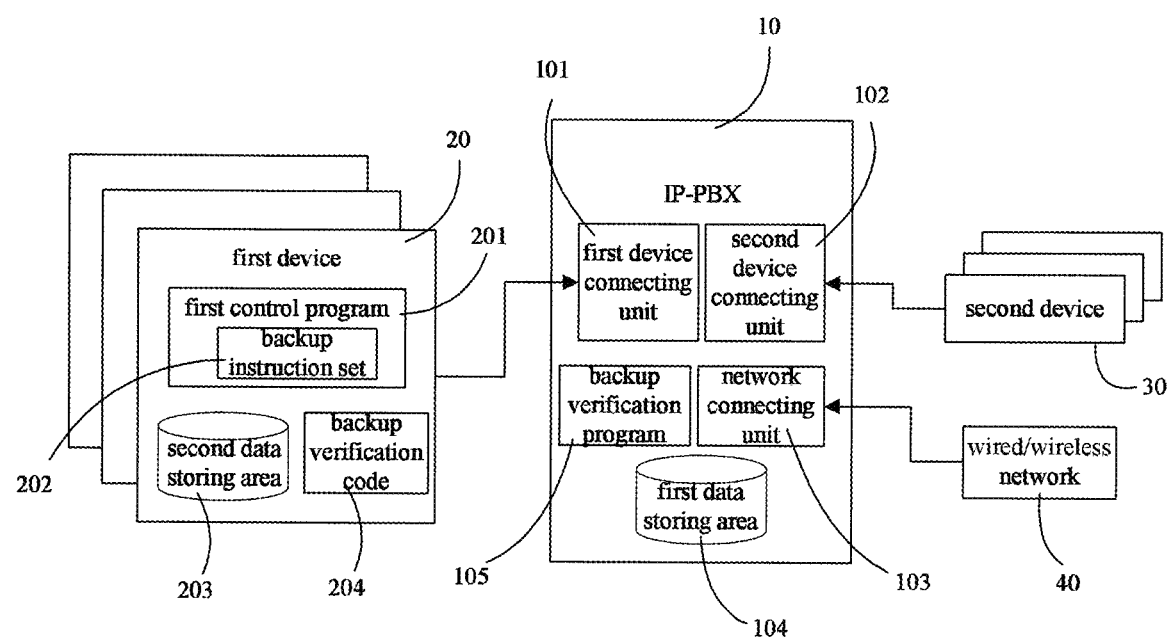
FIG. 1 is a diagram schematically illustrating an IP-PBX system with the capability of automatic data backup according to an embodiment of the present invention.

Refer to FIG. 1. The IP-PBX (Internet Protocol Private Branch exchange) system of the present invention comprises an IP-PBX 10, one or more first devices 20, one or more second devices 30, and one or more third devices 50. The IP-PBX 10 comprises first device connecting units 101, second device connecting units 102, network connecting units 103, and at least a first data storing area 104. The IP-PBX 10 is installed with a backup verification program 105 including the user information of the user of the first device 20. The first device connecting units 101, the second device connecting units 102, and the network connecting units 103 are electrically connected to a motherboard. The first device connecting unit 101 is correspondingly electrically connected to the first device 20. The second device connecting unit 102 is correspondingly electrically connected to the second device 30. The backup verification program 105 verifies the backup permission of the first device 20 or the second device 30 when the first device 20 or the second device 30 reads the first data storing area 104. The first device 20 is a storing medium having at least a second data storing area 203. The first device 20 is installed with a first control program 201 including the user information and at least a backup verification code 204. The first control program 201 drives a backup instruction set 202 to automatically search the first data storing area 104 of the IP-PBX 10 and downloads the content of the first data storing area 104 of the IP-PBX 10 to the first device 20 according to the backup verification code 204 when the first device 20 is electrically connected to the first device connecting unit 101 of the IP-PBX 10.

Figure 2:
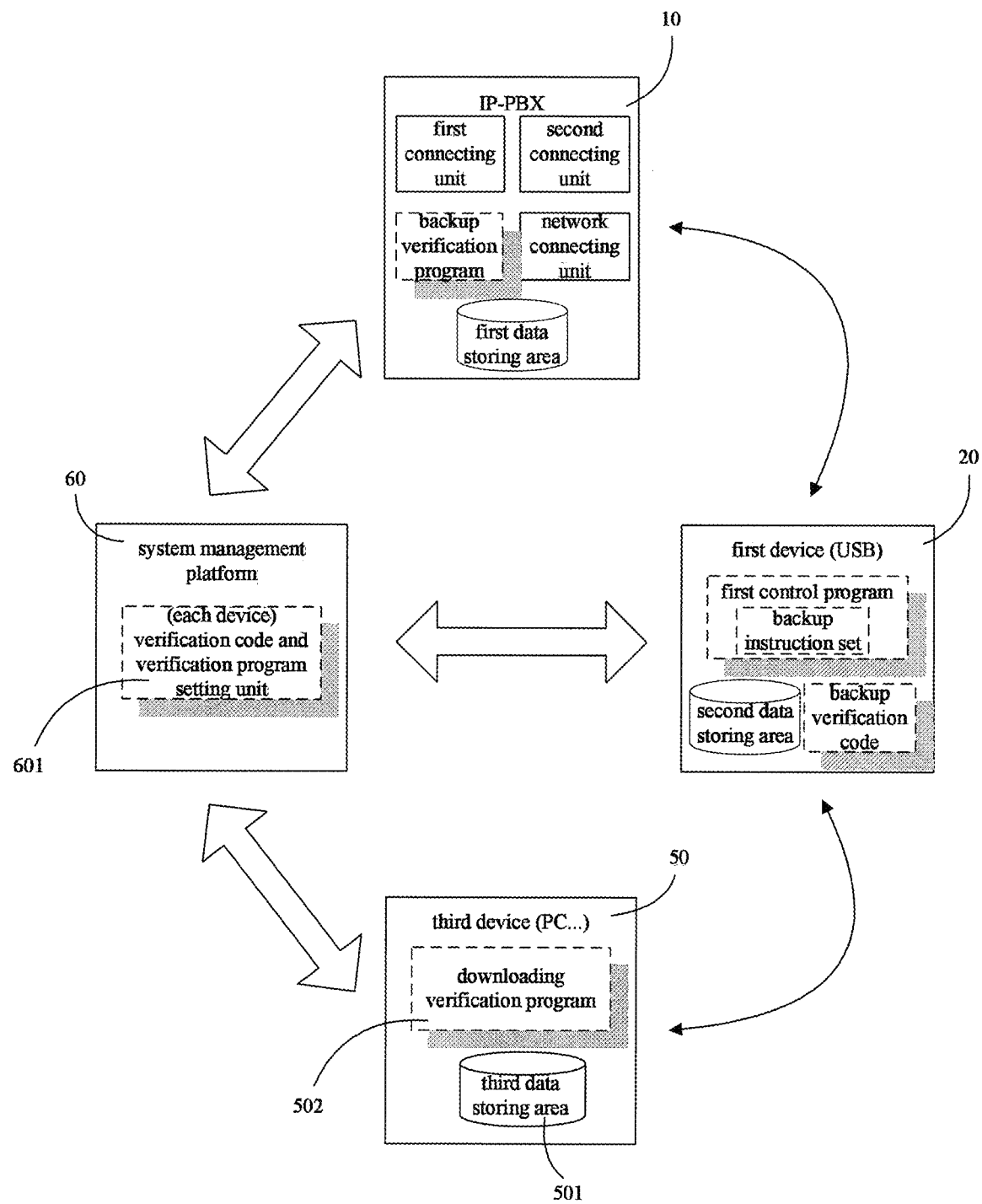
FIG. 2 is a diagram schematically illustrating an IP-PBX system with the capability of automatic data backup according to another embodiment of the present invention.

Refer to FIG. 2. The IP-PBX system of the present invention further comprises a system management platform 60 installed with a verification code and a verification program setting unit 601. The verification program setting unit 601 is used to install the verification code into the first device 20 and install the verification program into the IP-PBX 10 and the third device 50 in advance. The IP-PBX 10 is installed with the backup verification program 105 using the system management platform 60. The first device 20 is installed with the first control program 201 and the backup verification code 204 using the system management platform 60. The third device 50 is electrically connected to the system management platform 60. The third device 50 is installed with a downloading verification program using the system management platform 60.

The third device 50 is electrically connected to the first device 20. The first device 20 copies and transfers the content of the first data storing area 104 to the third device 50.

In a preferred embodiment of the present invention, the first device connecting units 101 are USB (Universal Serial Bus) ports and the first devices 20 are USB disks.

The second device connecting units 102 comprise AUX (auxiliary) ports, serial ports, I/O (input/output) ports, or a combination of these. The second device 30 may be a personal computer, a notebook computer, a server, a smartphone, a telephone, or an electronic device.

The user or the administrator of the IP-PBX 10 prepares for a data storing device as the third device 50, such as a large-capacity hard disk, a personal computer, or a notebook computer.

The network connecting unit 103 is a connecting port of a wired/wireless network 40.

Figure 3:
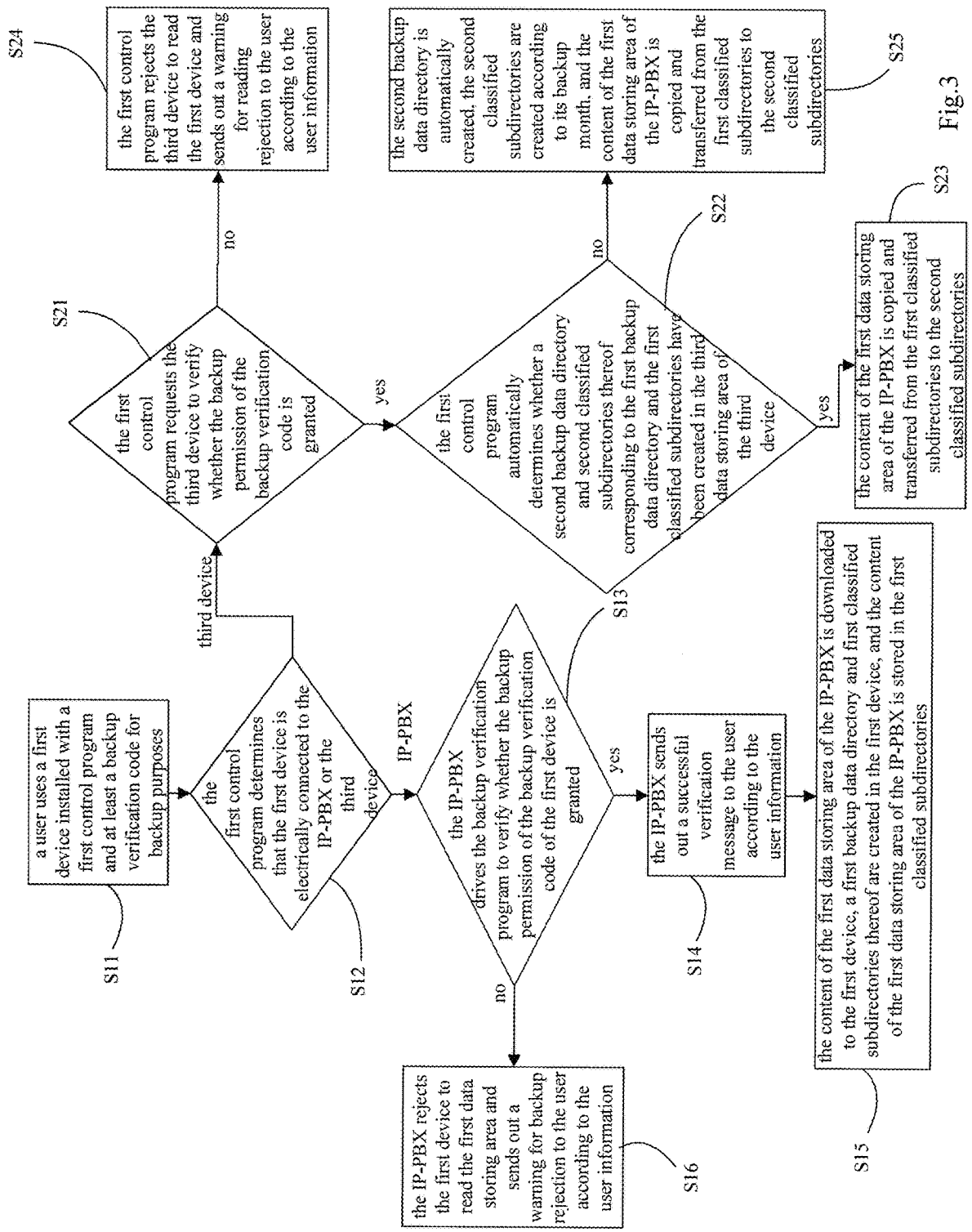
FIG. 3 is a flowchart of a method of using the IP-PBX system according to an embodiment of the present invention.

Refer to FIG. 3. The method of using the IP-PBX system is described as follows.

In Step S11, a user uses the first device installed with the first control program and the at least a backup verification code for backup purposes. In Step S12, the first control program determines that the first device is electrically connected to the IP-PBX or the third device. When the first device is electrically connected to the IP-PBX, the first control program driving the backup instruction set to automatically search the first data storing area of the IP-PBX and Step S13 is performed. When the first device is electrically connected to the third device, Step S21 is performed. In Step S13, the IP-PBX drives the backup verification program to verify whether the backup permission of the backup verification code of the first device is granted. If the answer is yes, the process proceeds to Step S14 and Step S15 is performed. In Step S14, the IP-PBX sends out a successful verification message to the user according to the user information. If the answer is no, the process proceeds to Step S16. In Step S16, the IP-PBX rejects the first device to read the first data storing area and sends out a warning for backup rejection to the user according to the user information. In Step S15, the content of the first data storing area of the IP-PBX is downloaded to the first device, a first backup data directory and first classified subdirectories thereof are created in the first device, and the content of the first data storing area of the IP-PBX is stored in the first classified subdirectories. In Step S21, the first control program requests the third device to verify whether the backup permission of the backup verification code is granted. If the answer is yes, Step S22 is performed. If the answer is no, the process proceeds to Step S24. In Step S24, the first control program rejects the third device to read the first device and sends out a warning for reading rejection to the user according to the user information. In Step S22, the first control program automatically determines whether a second backup data directory and second classified subdirectories thereof corresponding to the first backup data directory and the first classified subdirectories have been created in the third data storing area of the third device. If the answer is no, the process proceeds to Step S25. In Step S25, the second backup data directory is automatically created, the second classified subdirectories are created according to its backup month, and the content of the first data storing area of the IP-PBX is copied and transferred from the first classified subdirectories to the second classified subdirectories. If the answer is yes, the process proceeds to Step S23. In Step S23, the content of the first data storing area of the IP-PBX is copied and transferred from the first classified subdirectories to the second classified subdirectories.

The first devices may be USB disks. The IP-PBX is installed with the backup verification program using the system management platform. The first device is installed with the first control program and the backup verification code using the system management platform. The third device is electrically connected to the system management platform through a network. The third device is installed with a downloading verification program using the system management platform. The third device is electrically connected to the first device. The first device copies and transfers the content of the first data storing area to the third device.

After the user has connected the USB disk installed with the first control program and the backup verification code to the IP-PBX, the first control program determines that the USB disk electrically connects to the IP-PBX or the third device (e.g., the data storing device prepared by the user or the administrator of the IP-PBX, such as a large-capacity hard disk, a personal computer, or a notebook computer). When the USB disk electrically connects to the IP-PBX, the first control program requests the IP-PBX to verify the backup verification code of the USB disk. In other words, the first control program sends out a verification request to the IP-PBX to drive the backup verification program, thereby verifying whether the backup permission of the backup verification code of the USB disk is granted. If the answer is yes, the IP-PBX sends out a successful verification message to the mobile device of the user according to the user information and the first control program downloads the content of the first data storing area of the IP-PBX to the USB disk. If the answer is no, the IP-PBX rejects the USB disk to read the first data storing area and sends out a warning for backup rejection to the mobile device of the user according to the user information.

After the user has connected the USB disk installed with the first control program and the backup verification code to the third device (e.g., the data storing device prepared by the user or the administrator of the IP-PBX, such as a large-capacity hard disk, a personal computer, or a notebook computer), the first control program determines that the USB disk electrically connects to the IP-PBX or the third device. When the USB disk electrically connects to the third device, the first control program requests the third device to verify the backup verification code of the USB disk. In other words, the first control program sends out a verification request to the third device to drive the downloading verification program, thereby verifying whether the backup permission of the backup verification code of the USB disk is granted. If the answer is yes, the first control program automatically determines whether a second backup data directory and second classified subdirectories thereof corresponding to the first backup data directory and the first classified subdirectories have been created in the third data storing area of the third device. If the answer is yes, the content of the first data storing area of the IP-PBX is directly stored in the second classified subdirectories. If the answer is no, the second backup data directory is automatically created, the second classified subdirectories are created according to its backup month, and the content of the first data storing area of the IP-PBX is copied and transferred from the first classified subdirectories to the second classified subdirectories. If the backup permission of the backup verification code of the USB disk is not granted or the third device is not installed with the downloading verification program using the system management platform, the first control program rejects the third device to read the USB disk and sends out a warning for reading rejection to the mobile device of the user according to the user information.

In conclusion, the IP-PBX system is installed with the data storing media and the automatic verification backup program. As soon as the IP-PBX is connected to a device, the IP-PBX automatically uses the data storing media and the automatic verification backup program to copy and transfer stored data to the device for backup purposes and to automatically classify the backup data in the device, such that the administrator of the IP-PBX periodically and easily transfers the stored data to complete data backup. The present invention is novel technology in the field of data backup. The applications in mobile functions and human-machine interaction described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An Internet Protocol Private Branch Exchange (IP-PBX) system with the capability of automatic data backup comprising:
    an Internet Protocol Private Branch Exchange (IP-PBX), comprising first device connecting units, second device connecting units, network connecting units, and at least a first data storing area, installed with a backup verification program; and
    one or more first devices and one or more second devices, the first device connecting unit is correspondingly electrically connected to the first device, the second device connecting unit is correspondingly electrically connected to the second device, the backup verification program verifies backup permission of the first device or the second device when the first device or the second device reads the at least a first data storing area, the first device is a storing medium having at least a second data storing area, the first device is installed with a first control program and at least a backup verification code, and the first control program drives a backup instruction set to automatically search the at least a first data storing area of the IP-PBX and downloads a content of the at least a first data storing area of the IP-PBX to the first device according to the at least a backup verification code when the first device is electrically connected to the first device connecting unit of the IP-PBX.

2. The IP-PBX system according to claim 1, wherein the first device connecting units are USB ports.

3. The IP-PBX system according to claim 1, wherein the first devices are USB disks.

4. The IP-PBX system according to claim 1, wherein the second device connecting units comprise AUX ports, serial ports, I/O ports, or a combination of these.

5. The IP-PBX system according to claim 4, wherein the second device is a personal computer, a notebook computer, a server, a smartphone, a telephone, or an electronic device.

6. The IP-PBX system according to claim 1, wherein the network connecting unit is a connecting port of a wired network or a wireless network.

7. The IP-PBX system according to claim 1, wherein the IP-PBX is installed with the backup verification program using a system management platform.

8. The IP-PBX system according to claim 1, wherein the first device is installed with the first control program and the at least a backup verification code using a system management platform.

9. The IP-PBX system according to claim 1, further comprising one or more third devices, the third device is electrically connected to the first device, and the first device copies and transfers the content of the at least a first data storing area to the third device.

10. The IP-PBX system according to claim 9, wherein the third device is electrically connected to a system management platform and installed with a downloading verification program.

11. The IP-PBX system according to claim 7, wherein the system management platform is installed with a verification code and a verification program setting unit.

12. The IP-PBX system according to claim 8, wherein the system management platform is installed with a verification code and a verification program setting unit.

13. The IP-PBX system according to claim 10, wherein the system management platform is installed with a verification code and a verification program setting unit.

14. A method applied to the IP-PBX system with the capability of automatic data backup of claim 1, the IP-PBX system further comprising one or more third devices, the third device having a third data storing area, electrically connected to a system management platform and installed with a downloading verification program, and the method comprising:
    Step (A): a user using the first device installed with the first control program and the at least a backup verification code for backup purposes;
    Step (B): the first control program determines that the first device is electrically connected to the IP-PBX or the third device:
        when the first device is electrically connected to the IP-PBX, the first control program driving the backup instruction set to automatically search the at least a first data storing area of the IP-PBX and performing Step (C); and
        when the first device is electrically connected to the third device, performing Step (E);
    Step (C): the IP-PBX driving the backup verification program to verify whether backup permission of the at least a backup verification code of the first device is granted:
        if yes, sending out a successful verification message to the user and performing Step (D); and
        if no, rejecting the first device to read the at least a first data storing area of the IP-PBX and sending out a warning for backup rejection to the user;
    Step (D): downloading the content of the at least a first data storing area of the IP-PBX to the first device, creating a first backup data directory and first classified subdirectories thereof in the first device, and storing the content of the at least a first data storing area of the IP-PBX in the first classified subdirectories;
    Step (E): the first control program requesting the third device to verify whether backup permission of the at least a backup verification code is granted:
        if yes, performing Step (F); and
        if no, rejecting the third device to read the first device and sending out a warning for reading rejection to the user; and
    Step (F): the first control program automatically determining whether a second backup data directory and second classified subdirectories thereof corresponding to the first backup data directory and the first classified subdirectories have been created in the third data storing area of the third device:
- if no, automatically creating the second backup data directory, creating the second classified subdirectories according to its backup month, and copying and transferring the content of the at least a first data storing area of the IP-PBX from the first classified subdirectories to the second classified subdirectories; and
- if yes, copying and transferring the content of the at least a first data storing area of the IP-PBX from the first classified subdirectories to the second classified subdirectories.

15. The method according to claim 14, wherein the first devices are USB disks and the IP-PBX is installed with the backup verification program using a system management platform.

16. The method according to claim 14, wherein the first device is installed with the first control program and the at least a backup verification code using a system management platform.

17. The method according to claim 14, wherein the third device is electrically connected to a system management platform through a network and installed with a downloading verification program.

18. The method according to claim 15, wherein the system management platform is installed with a verification code and a verification program setting unit.

19. The method according to claim 16, wherein the system management platform is installed with a verification code and a verification program setting unit.

20. The method according to claim 17, wherein the system management platform is installed with a verification code and a verification program setting unit.

* * * * *